UNITED STATES PATENT OFFICE.

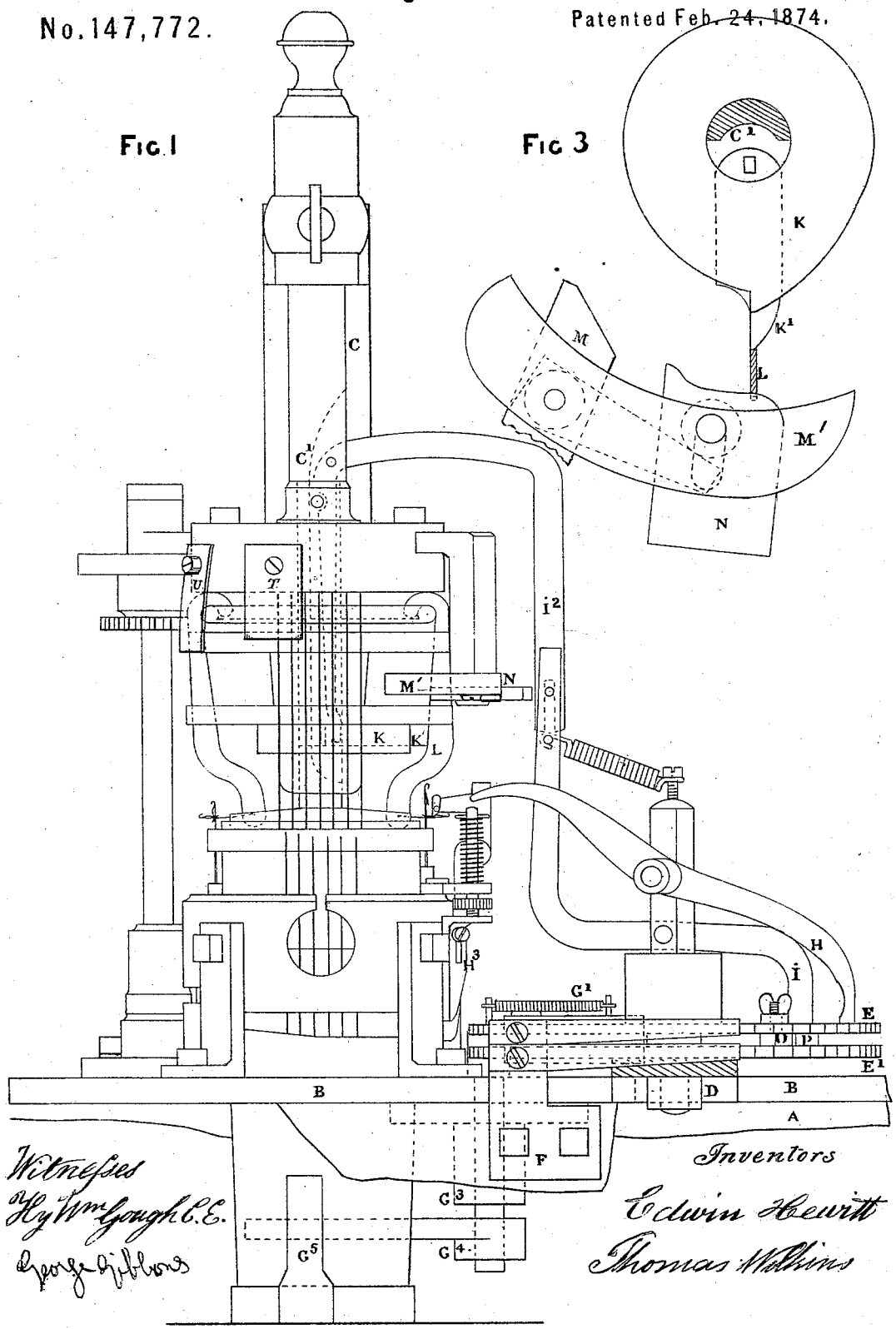
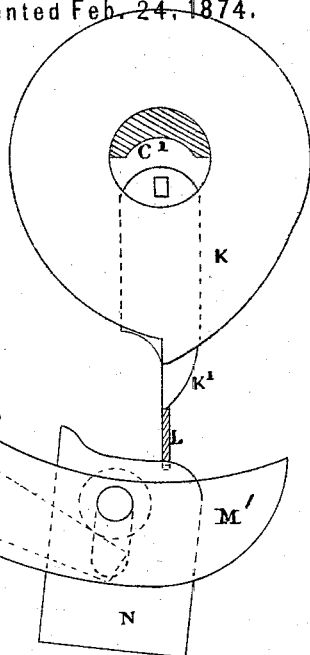

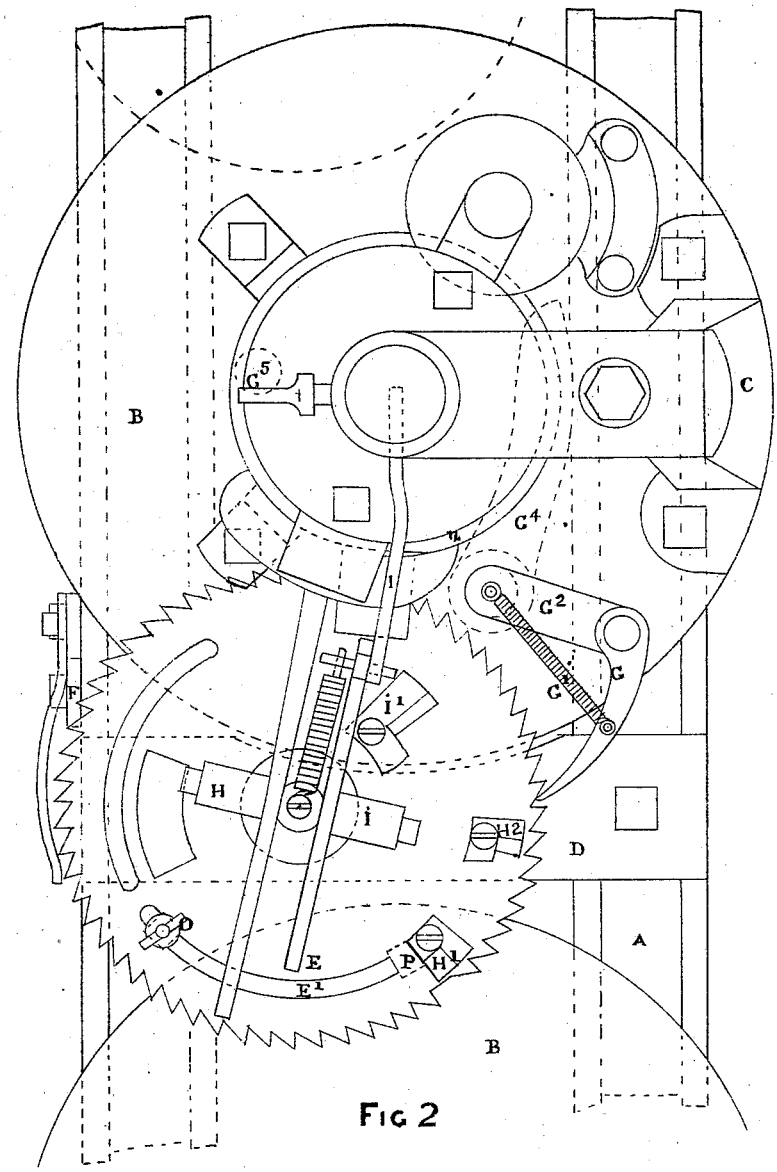

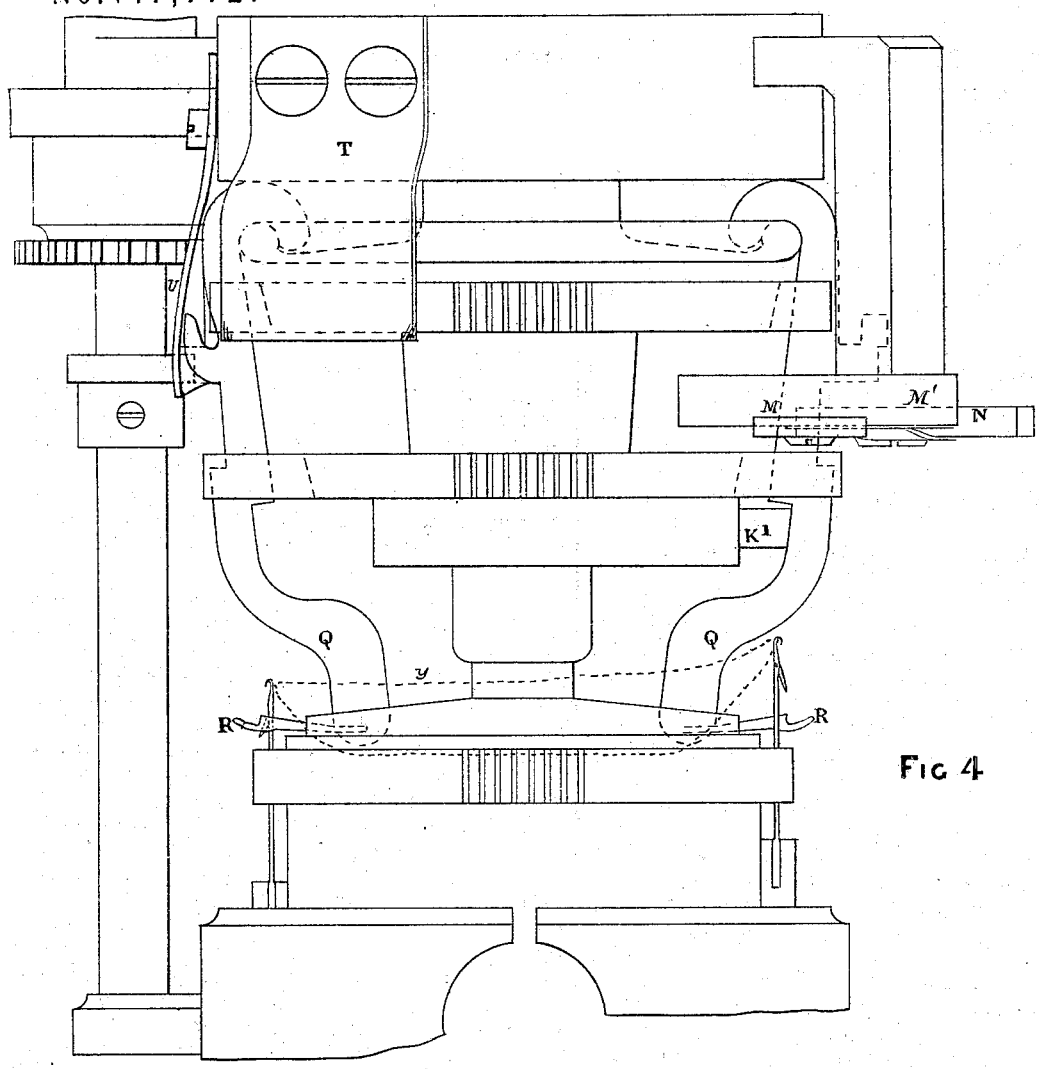

EDWIN HEWITT AND THOMAS WILKINS, OF NOTTINGHAM, ENGLAND, ASSIGNORS OF ONE-HALF THEIR RIGHT TO JOHN KENT, OF NEW YORK, N. Y.

IMPROVEMENT IN KNITTING-MACHINES.

Specification forming part of Letters Patent No. 147,772, dated February 24, 1874; application filed August 14, 1872.

*To all whom it may concern:*

Be it known that we, EDWIN HEWITT and THOMAS WILKINS, both of Nottingham, England, have invented certain Improvements in Machinery for the Manufacture of Looped Fabrics, of which the following is a specification:

The first part of our invention relates to improved apparatus to be applied to a circular machine for making ribbed looped fabrics, so as to cause the said machine to make a welt and slack course without stopping, the mechanism being adapted for making ribbed tops of divers lengths; and the second part of our invention relates to apparatus we employ to form two knotted selvages down the fabric produced.

Figure 1 is a side elevation of a machine embodying parts of our invention. Fig. 2 is a plan of the same. Fig. 3 is a plan of portion of the improved apparatus. Fig. 4 is a side elevation, and Fig. 5 a plan, of parts constituting another part of our invention.

A is portion of the bed, which is made long enough to support several frame-heads, B, the machine-head of each being held by a bracket, C, bolted to the flange of the frame-head. Both the heads are of the usual construction, and are driven simultaneously in usual way, but are provided, in addition, with the following parts, namely, a bar, D, secured to the bed, and carrying an axle, upon which two toothed ratchet-wheels, E and E', revolve. These wheels are each furnished with a spring, which press upon the teeth and prevent the wheels moving, except when racked by the driver G. The springs are secured to a bracket, F, attached to the bed. The driver G is hinged to an arm, $G^2$, a spring, $G^1$, being attached to both arm and driver. The arm $G^2$ is secured to the upper end of an axle carried by a bearing, $G^3$, screwed to the under side of the flange of the frame-head. The lower end of the axle carries a lever, $G^4$, which is struck once at each revolution of the head by a pin, $G^5$, which is secured to and carried by the boss of the driving-wheel under the bed, by which arrangement one or both ratchet-wheels are moved the space of one tooth at each revolution of the head. The axle carried by the bar D projects above the ratchet-wheels, and carries two pins, which form axles for two levers, H and I, which are operated by inclines $H^1$, $H^2$, and $I^1$, secured to the top side of the ratchet-wheel E, which is racked around tooth by tooth, passing the inclines $H^1$ and $H^2$, successively, under the lower end of the lever H, which will raise it, and lower the upper end of the lever, which, pressing upon the stem of a star-screw, which is attached at its lower end to an incline or cam bit, $H^3$, will lower the said incline and the frame-needle bits as they successively pass under it during one revolution of the head, thus causing the frame-needles to draw a longer loop while making a slack course, each incline making one slack course—one to cut off by, and the other to run on by. The lever I has a pin at its upper end, which takes into a slot in the outer end of a double-ended lever, $I^2$, which moves on an axle carried by the suspending rod and axle C' of the machine-head, which axle is cut partly away and grooved out, as seen at Fig. 3, and also shown by dotted lines in Fig. 1, to allow of the to-and-fro movements of the inner end of the lever $I^2$, which takes into a slot in the inner end of a cam-bit, K', which slides horizontally in the machine-cam K, of the usual construction, which throws out the machine needle-bits L, such bits being moved inward by a cam-plate, M, which is carried by a bracket, M', adjustable in the machine-head. This bracket is grooved on the under side to receive a sliding cam-plate, N, which is slotted to receive a stud, and is pressed upon by a spring carried by the bracket M'. The lever I is provided with a spring, which is attached to it, and also to the upper end of the axle of the ratchet-wheel. This spring holds the levers I and $I^2$ and cam-bits K' and N in the positions seen at Figs. 1, 2, and 3, while the ordinary ribbed work is being made. But when a welt is being made, the lower end of the lever I is raised by the incline $I^1$, such movement pressing in the cam-plate N and the double-ended lever $I^2$, the inner end of which draws in the cam-bit K', so as to place the needles carried by the bits L in such a position within the ring of frame-needles that they cannot take a loop from the frame-needles during the making of three courses, which being completed, the machine-needles are projected outward for making the ordinary work, which is continued until the top is knitted the required length, and the incline H¹ again comes under the end of the lever H; then a slack course is made; then two or more courses of ordinary work; then another slack course, and immediately afterward another welt is formed, as before, and so on. We adjust a stud, O, in either of the two slots in the ratchet-wheel E, so that as the said wheel is racked around the stud O will strike a stud, P, which lies between the two wheels, but is secured in the lower wheel E′, which is carried around by the stud O in the upper wheel, both wheels being driven by the driver G, acting upon their teeth; but as there is one tooth cut away in each wheel, when such space in the bottom wheel comes opposite the end of the driver, such wheel will not be operated by the driver, but the top wheel will be racked around until its stud O strikes the stud P in the lower wheel, when the movements will be repeated. Thus, by adjusting the stud O at the opposite end of the slot seen at Fig. 2, a top may be made of nearly twice the number of courses the ratchet-wheel E is set out for.

In the next part of our invention we produce two knotted selvages down the fabric by apparatus arranged as follows: In each circular head, constructed as above described, we take out four adjoining machine needle-bits, and substitute two bits, Q, (seen in side view at Fig. 4,) in the lower end of each of which bits we solder or otherwise secure a hook, R, which are operated by the cam-bit K′, and cam-plate N, which throw out the hooks on the inside the frame-needles S S, as shown at the right side of Figs. 4 and 5, each hook passing under and securing the thread which they hold, until the frame-needles are lowered, and as the needles rise again they will be in the position shown on the left side of Figs. 4 and 5, in which position they are held during the rising of the needles by a cam-plate, T, secured to the machine-head, such operations placing the thread around the needles S S. The hooks are then thrown back clear of the fabric through the bits being pressed by a stationary cam, U, secured to the machine-head. Such movements being repeated at each revolution of the head, two knotted selvages will be formed down the fabric, with horizontal threads lying between them.

We may mention that the hooks R R are curved horizontally, so that a recess is formed on each of sufficient size to receive the frame-needles, and are placed back to back, in the relative position shown in Fig. 5. The dotted line $y$ shows the height of the tops of the needles at the various stages of their revolution. At the right hand of Figs. 4 and 5, the hooks are represented in the position in which they are when thrown out to take the thread from the needles. The foremost hook, when it has thus taken the thread, holds it until about one-third of a revolution has been traversed, and is in the meantime gradually drawn back. It is then suddenly thrown out by means of the cam-plate T, and the needle, having immediately descended below the level of the hook after the latter took the thread, as before mentioned, and being still below the level of the hook, immediately rises, and the recess in the hook being now exactly opposite the needle, the latter rises within the recess, and consequently on the opposite side of the hook. This being done, the hook is suddenly thrown back, and the needle then, being above the level of the hook, again takes the thread from the hook, and carries it during the remainder of the revolution. The thread is thus placed around the needle. The hook is then thrown back clear of the needles by the cam U, and when it is again thrown out, (as in the position first mentioned, viz., at the right hand of Figs. 4 and 5,) it will be so thrown out on the same side of the needle as first mentioned. These changes of the position of the hook from one side of the needle to the other are caused wholly by the different relative positions assumed by the needle and hook in regard to the recess in the latter as it moves back and forth, as above described. The movements of the other hook are the same, except that the recess is on the opposite side, and as the curves or recesses are on opposite sides of the hooks, the two selvages are formed, as before mentioned.

Having described the nature of our invention, and in what manner the same may be performed, we claim—

1. The combination of the cam-bit K′, cam-plate the levers I and I², the slotted top wheel ⌐, carrying the inclines H¹, H², and I¹, the adjustable stud O, the wheel E′, and fixed stud P, substantially as and for the purposes hereinbefore set forth.

2. The combination of the bits Q, hooks R, cam-plate T, and cam U, substantially as and for the purpose set forth.

EDWIN HEWITT.
THOMAS WILKINS.

Witnesses:
Hy. Wm. Gough, C. E.,
Gorge Gibbons.